United States Patent [19]

Mayer

[11] 3,916,698
[45] Nov. 4, 1975

[54] APPARATUS FOR MEASURING THE RPM OF A ROTATING SHAFT

[76] Inventor: Friedrich Mayer, Follstrasse 9D, 8900 Augsburg 21, Germany

[22] Filed: Mar. 14, 1974

[21] Appl. No.: 451,181

[30] Foreign Application Priority Data
Mar. 14, 1973 Germany............................ 2312718

[52] U.S. Cl.................................... 73/518; 73/524
[51] Int. Cl.² ...................... G01P 3/34; G01P 3/42
[58] Field of Search ............ 73/518, 519, 524, 525

[56] References Cited
UNITED STATES PATENTS

| | | | |
|---|---|---|---|
| 474,447 | 5/1892 | Gibboney........................ | 73/519 X |
| 1,093,166 | 4/1914 | Asquith............................. | 73/524 |
| 3,363,453 | 1/1968 | Erickson.......................... | 73/521 X |

FOREIGN PATENTS OR APPLICATIONS

| | | | |
|---|---|---|---|
| 460,078 | 10/1949 | Canada.................................. | 73/518 |

Primary Examiner—James J. Gill
Attorney, Agent, or Firm—Edwin E. Greigg

[57] ABSTRACT

An apparatus for measuring the rpm of a rotatable shaft includes a circular disc fixedly connected to the rotatable shaft. A resiliently mounted sensing pin lies opposite a surface of the circular disc, a face of the pin being spaced very closely to the surface of the disc. The face of the pin and the surface of the disc opposite this face are provided with a degree of roughness. The area of the face of the pin is sufficiently large so that when the rotating disc transports an air stream past the face of the pin, the pin is displaced. The displacement of the sensing pin is a measure of the rpm of the rotating shaft. The sensing pin may be displaced, depending on the nature of its mounting, either in a direction tangential to the direction of rotation of the disc or in a direction which is perpendicular to the tangential direction.

13 Claims, 12 Drawing Figures

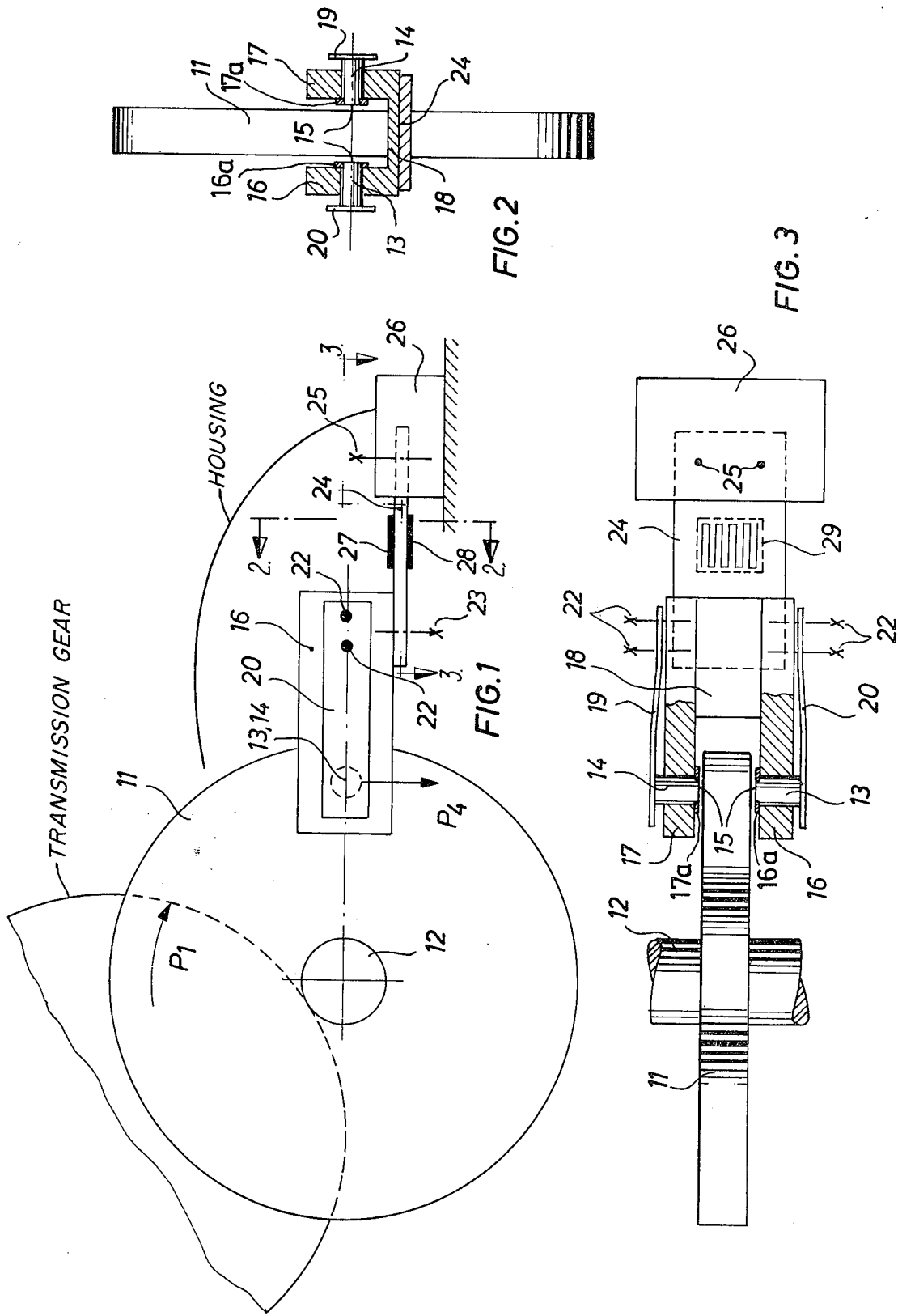

APPARATUS FOR MEASURING THE RPM OF A ROTATING SHAFT

BACKGROUND OF THE INVENTION

This invention relates to an apparatus for measuring the rpm of a rotating shaft in a braking system. The present invention relates, more particularly, to an apparatus for measuring the rpm of a rotating shaft in an intermittently acting, automatic braking system for motor vehicles.

In order to shorten the braking distance of motor vehicles, it has been proposed to use automatic, intermittently acting braking systems. The braking action during the braking intervals in the proposed system is greater than would be permissible for continuous braking to a complete stop, without incurring the danger of skidding. During the time periods lying between these braking intervals, the braking action is either less than or at most only as great as that which occurs during the continuous braking.

Since the reduction of speed during the intermittent braking intervals is greater than would be the case without plural time periods having the duration of these braking intervals but under the influence of continuous braking effort, the total time required to bring a vehicle to a complete stop is reduced, when compared to the time which must elapse during continuous braking. The much higher braking force used in intermittently occurring braking, as opposed to continuous braking, also results in a much shorter total required braking distance. An rpm measuring instrument, such as a tachometer, and a suitable control system for the brakes are required for any such automatic, intermittently acting braking system so that the individual braking cycles can occur in the manner described.

It is known to measure rpm by means of photoelectric sensors, i.e. in principle to derive a pulse repetition rate (frequency) proportional to the rotational speed to be measured. This can be accomplished by using a perforated disc and a photocell. Other systems, also serving for rpm measurement, are also known, e.g. magnetic pickup heads associated with ferromagnetic perforated or toothed discs. Other systems also are known which use tach-generators of various designs.

SUMMARY OF THE INVENTION

It is an object of the present invention to provide an apparatus for measuring the rpm of a rotating shaft which avoids the need for a perforated disc or equivalent.

It is another object of the present invention to provide an apparatus for measuring the rpm of a rotating shaft which avoids the need for magnetic pickup heads and associated circuits.

It is a further object of the present invention to provide an apparatus for measuring the rpm of a rotating shaft which does not require a light source.

It is an additional object of the present invention to provide an apparatus for measuring the rpm of a rotating shaft which does not require a toothed disc or the like.

It is yet another object of the present invention to provide an apparatus for measuring the rpm of a rotating shaft which is particularly suitable for use in motor vehicles.

The foregoing objects, as well as others which are to become apparent from the text below, are accomplished by providing an apparatus for measuring rpm of a rotatable shaft which includes a circular disc and at least one resiliently mounted sensing pin. The circular disc is fixedly connected to the rotatable shaft, a surface of the disc having at least a given degree of roughness. The resiliently mounted sensing pin has a face of at least a predetermined area, the face having a predetermined degree of roughness and being positioned opposite the surface of the disc which is rough and in close proximity thereto. When the circular disc is rotated by the rotatable shaft, the disc transports an air stream past the face of the sensing pin so as to displace it, the displacement being a measure of the rpm of the shaft.

In a preferred embodiment of the apparatus, the sensing pin is resiliently mounted for displacement in a direction which is substantially tangential to the direction of rotation of the circular disc.

In another preferred embodiment of the apparatus, the sensing pin is resiliently mounted for displacement in a direction which is substantially perpendicular to a direction which is tangential to the direction of rotation of the circular disc.

The circular disc may desirably by the brake disc of a motor vehicle.

The sensing pin may be positioned opposite one of the side surfaces of the circular disc.

In the event two sensing pins are used, they may advantageously be placed opposite respective side surfaces of the circular disc.

In one embodiment the sensing pin is placed opposite the circumferential surface of the circular disc.

During operation, the face of a sensing pin lies opposite a homogeneous, circular disc fixedly coupled to the rotating shaft, at a small distance therefrom. The surface roughness of the disc and of the face of the sensing pin, as well as the diameter of the face of the pin, are chosen so that the rotating disc transports an air stream past the face of the sensing pin. The sensing pin is resiliently mounted, either in a direction tangential to the rotation of the disc or perpendicular to this tangential direction. In both cases, the displacement of the sensing pin, which increases and decreases according to the rpm, is measured. The displacement is a measure of the rpm of the rotating shaft.

BRIEF DESCRIPTION OF THE DRAWINGS

FIG. 1 is a diagrammatic elevational view, partly in section, of an apparatus for measuring rpm of a rotatable shaft according to one embodiment of the present invention.

FIG. 2 is a cross-sectional view of the apparatus for measuring rpm shown in FIG. 1, taken along section lines 2—2.

FIG. 3 is a cross-sectional view of the apparatus for measuring rpm of a rotatable shaft shown in FIG. 1, taken along section line 3—3.

DETAILED DESCRIPTION OF THE PREFERRED EMBODIMENTS

Figure 4:
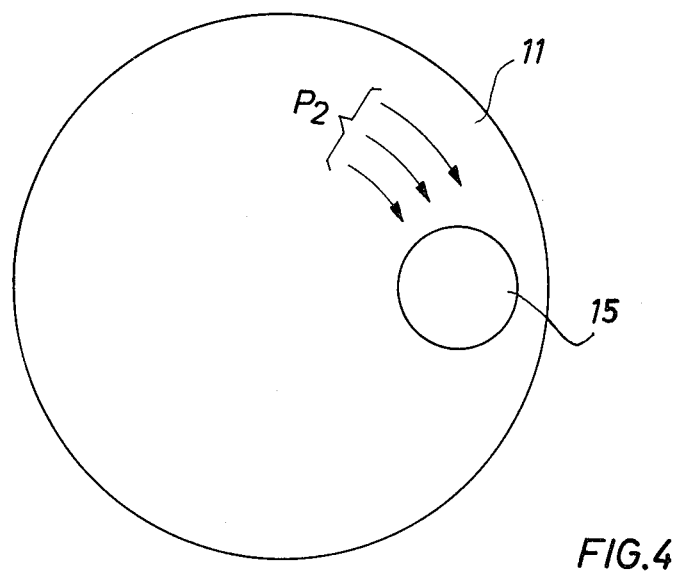
FIGS. 4 and 5 are respective schematic representations of portions of the apparatus for measuring rpm shown in FIGS. 1–3 which aid in understanding the operation of the apparatus illustrated in FIGS. 1–3, as well as the basic operation of other possible embodiments.

As illustrated in FIGS. 1–3, an illustrative embodiment of an apparatus for measuring rpm of a rotating shaft 12 includes a steel disc 11 approximately 120 mm in diameter and approximately 10 mm in thickness. To each of the two sides of steel disc 11, which is fixedly fastened to the shaft 12, there is assigned a respective sensing pin 13, 14 whose mutually opposite faces 15, which have a predetermined degree of roughness, lie at a distance of approximately one-tenth millimeter or of a few tenths of a millimeter from the side surface of the disc 11 during operation of the rpm measuring apparatus. The side surfaces of the disc 11 are provided, at least in the vicinity of the pins 13, 14, with a given degree of roughness. The two sensing pins 13, 14 are disposed in the mutually parallel legs 16, 17 of a U-shaped holder, as best seen in FIG. 2. The U-shaped holder includes an additional horizontal member 18 besides the mutually parallel legs 16, 17 already mentioned. The sensing pins 13, 14 are preloaded in the direction of the disc 11 by two leaf springs 19, 20, the pressure of which causes them to abut respective stops 16a, 17a, visible in FIGS. 2 and 3, so that the faces 15 of the pins 13, 14 and the side surfaces of the disc 11 are separated by respective gaps of approximately one-tenth mm. The two leaf springs 19 and 20 are fastened respectively on the two legs 16 and 17, by two rivets 22 (FIGS. 1 and 3). The U-shaped holder is connected to a strain gauge by a screw 23. The strain gauge consists of a resilient steel bar 24 of approximately 1 mm thickness and approximately 30 mm in length. The end of the bar 24, shown toward the right in FIG. 1, is connected by screws 25 to a fixed structural member 26 connected to or forming part of the chassis of the motor vehicle. Two serpentine resistors (resistance elements) 27, 28 of the strain gauge are positioned on two opposite major surfaces of the resilient steel bar 24, the serpentine nature of the resistance elements being illustrated by a line within a broken line rectangle 29 (FIG. 3).

The operation of the apparatus shown in FIGS. 1–3 is to be explained below, reference being made additionally to FIGS. 4 and 5.

In FIGS. 1–3, when the disc 11 begins to move in the clockwise sense, as diagrammatically shown in FIG. 4, it transports an air stream past the faces 15 of the pins 13, 14. The air stream gets progressively stronger with increasing rpm of the shaft 12 which rotates the disc 11. In FIG. 4, the arrow-headed lines P2 show the direction of this air stream for the disc 11 rotating clockwise. The face 15 of one of the pins 13, 14 is shown relatively enlarged in FIG. 4 for the sake of clarity. The air stream transported by the side surfaces of the disc 11 is visualized by a few stream lines 30. The air stream must pass between the faces 15 of the sensing pins 13, 14 and a circular zone 31, where the air is compressed because of the very small separation of the respective faces 15 from the zone 31. This air stream, which passes the above-mentioned air gap (FIG. 5) in the vertical direction, exerts a vertical force on the face 15 visible in FIG. 5, i.e. a force acting in the sense of an arrow-heated line P3, which can be considered to be a force transmitted by the disc 11 by virtue of air friction. The respective sensing pins 13, 14 do not yield in the horizontal direction, however, because they are pressed against the respective stops 16a, 17a, shown in FIGS. 2 and 3, by the respective springs 19, 20. It is a prerequisite for this transmission of force in the sense diagrammatically illustrated by the arrow-headed line P3 on the respective sensing pins 13, 14 that the zone 31, as well as the respective faces 15 possess a certain roughness, the degree of which must be determined empirically. A smoothly polished zone 31 and a smoothly polished face 15, in tests, did not produce sufficient air friction; whereas, a so-called very fine finishing using diamond tools did product sufficient roughness to effect a satisfactory transmission of the force in the region up to approximately 1,000 rpm and for air gaps of the above-stated size.

The forces, which act in the direction of arrow-headed line P4 (FIG. 1), are exerted on the sensing pins 13, 14, as shown in FIG. 1 and deform the strain gauge bar 24 in such a way that the serpentine resistor 27 on the upper surface of the steel bar 24 is extended, its resistance increasing; whereas, the serpentine resistor 28 on the lower surface of the steel bar 24 is compressed, its resulting increased diameter reducing the electrical resistance of the resistor 28. Thus, by using a suitable measuring bridge circuit which incorporates the two resistors 27 and 28, the displacement of the sensing pins 13, 14 in the direction of arrow-headed line P4 and hence also the rpm of the disc 11, can be measured. Incidentally, in a test the full range excursion was only 0.3 mm for the numerical conditions mentioned above. All or parts of the sensing apparatus may be enclosed in a housing.

Figure 5:
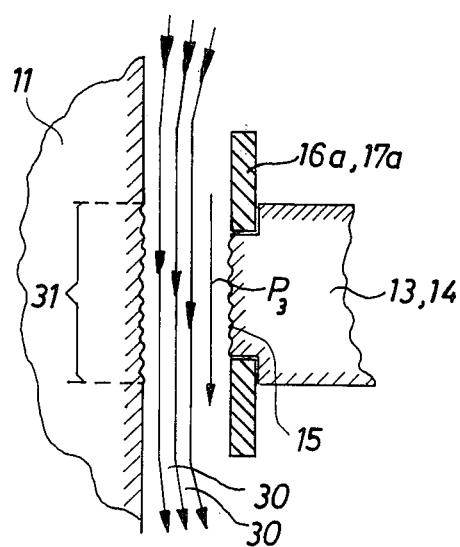
Figure 6:
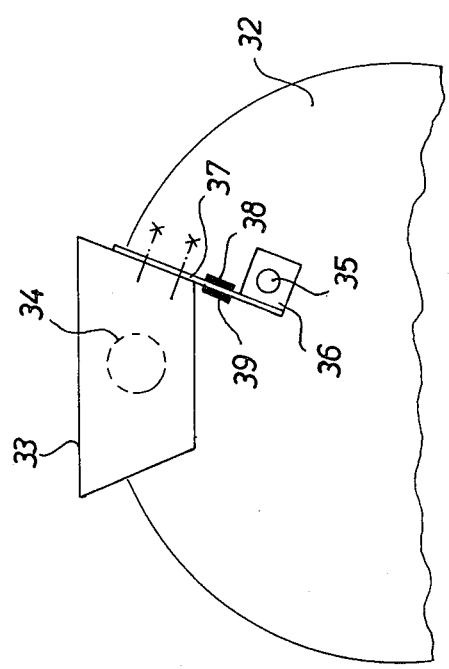
FIG. 6 is a diagrammatic partial view of a second embodiment of an apparatus for measuring rpm of a rotatable shaft according to the present invention, which includes a brake disc of a motor vehicle.

The embodiment of an apparatus for measuring rpm shown in FIG. 6 includes a brake disc 32 which is part of a conventional disc brake mechanism of a motor vehicle. The brake mechanism includes a brake yoke 33, brake pads 34, shown diagrammatically as a dotted line, and a sensing pin 35 carried in a fixed holder 36. The holder 36 is connected to the yoke 33 by a resilient, steel, bar-shaped member 37 which corresponds to the resilient, steel bar 24 of FIG. 1. Two serpentine resistors 38, 39 which are positioned on respective opposite surfaces of the steel, bar-shaped member 37, permit measurement of the rpm of the disc 32 and thus the shaft which drives it in the same way as discussed above in connection with FIGS. 1–5, since the sensing pin 35 is displaced in a direction tangential to the direction of rotation of the disc 32.

Figure 7:
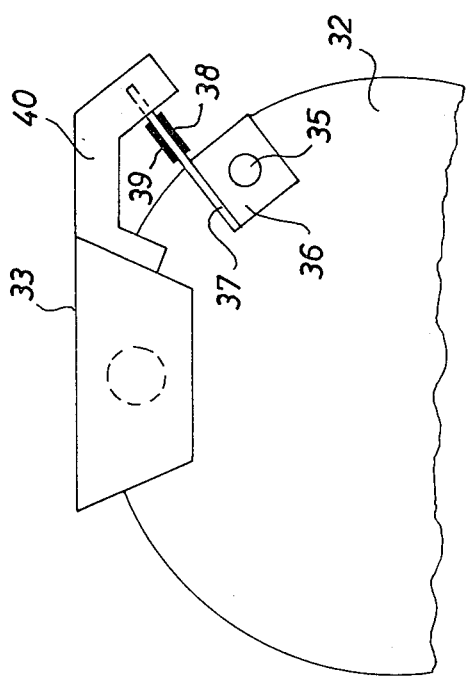
FIG. 7 is a diagrammatic partial view of a third embodiment of an apparatus for measuring rpm of a rotatable shaft according to the present invention, this embodiment being similar to that of FIG. 6 having its parts somewhat differently positioned.

The embodiment of an apparatus for measuring rpm illustrated in FIG. 7 is similar, in most respects, to the embodiment of FIG. 6. The particular radius along which the sensing pin 35 operates can be freely chosen between wide limits, even for the same diameter of the brake disc 32, by providing a suitable extension 40 to the brake yoke 33 is attached.

In the two embodiments illustrated respectively in FIGS. 6 and 7, it is possible also to provide an additional sensing pin in its own holder and having its own strain gauge near the back, not visible, major side surface of the braking disc 32. Thus, a symmetric installation, similar in this regard to the embodiment of FIGS. 1–3, may be provided.

Figure 8:
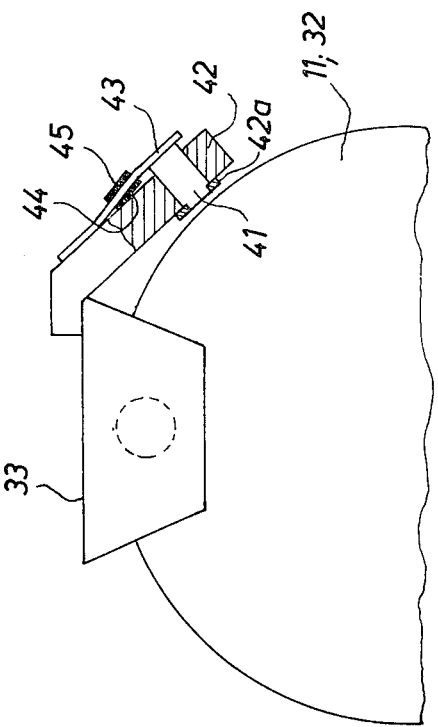
FIG. 8 is a diagrammatic partial view of a fourth embodiment of an apparatus for measuring rpm of a rotatable shaft according to the present invention, in which the circumferential surface of the circular disc is opposite the sensing pin.

In the embodiment of an apparatus for measuring rpm shown in FIG. 8, only a single sensing pin 41 cooperating with the circumferential surface of a steel disc 11, such as shown in FIG. 1, or a brake disc 32, such as illustrated in FIGS. 6 and 7, is associated with a strain gauge. This sensing pin 41, its stop 41a, its holder 42, again mounted on a brake yoke 33, and a leaf spring 43, which exerts its force along the longitudinal direction of the sensing pin 41, are provided. The leaf spring 43 has two resistors 44, 45 fastened to major opposite surfaces thereof. These resistors 44, 45 are constructed as the resistors 27, 28 shown in FIG. 1 on the steel bar 24 or the resistors 38, 39 shown on the bar 37 in FIG. 6.

Figure 9:
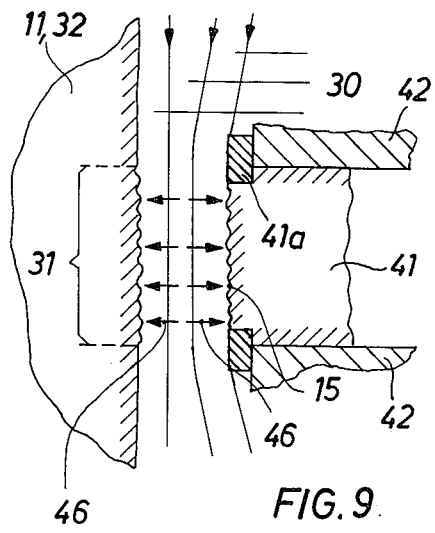
FIG. 9 is a schematic representation of a portion of the apparatus for measuring rpm illustrated in FIG. 8 which aids in understanding the operation of the apparatus of FIG. 8.

The method of operation of FIG. 8 is to be explained in conjunction with FIG. 9 which resembles FIG. 5, but which suggests that in addition to the forces acting tangentially, with respect to the direction of rotation of the disc 11, 32 and which were discussed above to explain the operation of the embodiment according to FIG. 1, forces perpendicular to the air stream designated by the lines 30 can also occur in the air gap between the respective faces 15 and the zone 31. These forces, acting transversely with respect to the longitudinal direction of the air stream are indicated by arrow-headed lines 46, perpendicular to that face 15 shown in FIG. 9, and to the circumferential surface of the disc 11 or 32 in the zone 31. These forces displace the sensing pin 41 more and more from the circumferential surface of the disc 11 or 32 with increasing speed. Thus, the sensing pin 41 is not movable in the vertical direction of FIG. 9. Thus, this enlargement of the air gap between the circumferential surface of the disc 11 or 32 and the face 15 of the sensing pin 41 can be measured by means of the resistors 44 and 45 and, in this way, a measured value can be obtained for the circumferential speed of the disc 11 or 32.

It is also possible to modify the embodiment shown in FIG. 9, to dispose a sensing pin near each side surface of the disc 11 or 32, as in FIGS. 1, 6 and 7, to provide a counter-acting movement, i.e. a movement in opposite phase of any two oppositely disposed sensing pins which, as mentioned above, can effect respectively the increase and decrease in resistance of two resistors forming part of a bridge circuit. These resistors could be carried on opposite surfaces of a resilient bar or the like.

Figure 10:
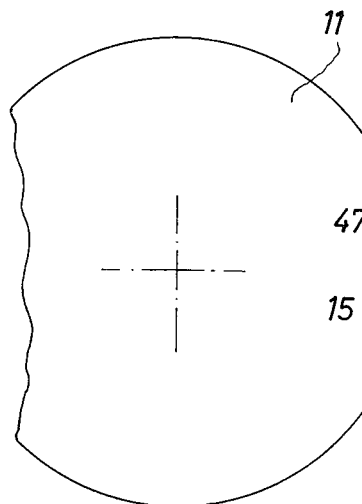
FIGS. 10–12 are respective mutually perpendicular views of a fifth embodiment of an apparatus for measuring rpm according to the present invention, the sensing pin being associated with the circumferential surface of the circular disc.
Figure 11:
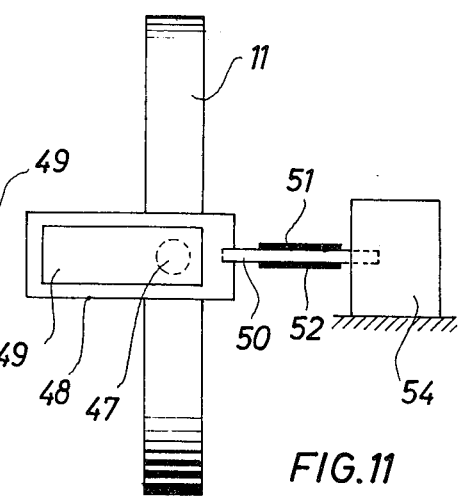
Figure 12:
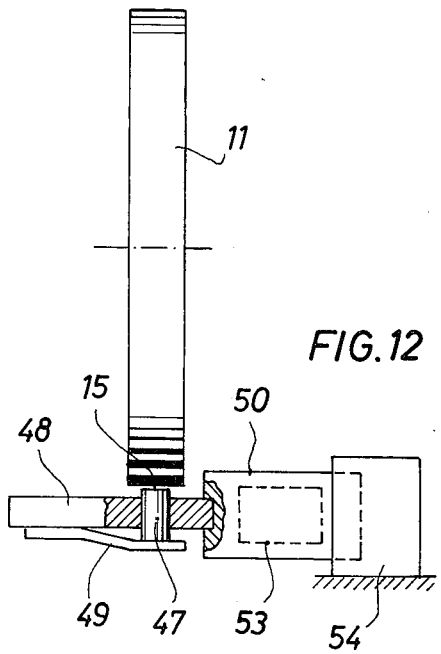

The three mutually perpendicular view of FIGS. 10–12 show an embodiment of an apparatus for measuring rpm in which a sensing pin 47 is positioned near the circumferential surface of a circular disc 11. The sensing pin 47 moves in a direction tangential to the disc 11 when the rpm of the disc 11 increases and decreases. Thus, the disposition of the sensing pin 47, with respect to the circular disc 11 in this embodiment, is comparable with the apparatus of FIG. 8. However, the movement of the sensing pin 47 with respect to the circular disc 11 is comparable to the movement of the pins in the apparatuses of FIGS. 1, 6, and 7. Inasmuch as the face 15 of the sensing pin 47 is displaced vertically within the measuring zone (FIGS. 10 and 11), the movement is parallel to the tangent to the circumferential surface of the circular disc 11.

The sensing pin 47 is carried in a holder 48 on which a leaf spring 49 is fixed. The leaf spring 49 presses the sensing pin 47 in the direction of the circumferential surface of the disc 11. The strain gauge includes a resilient, steel bar 50 and the resistors 51 and 52. The resistors 51 and 52 are desirably constructed as the resistors 27, 28 shown in FIG. 1. In FIG. 12, the surfaces covered by the resistors 51 and 52 are bordered by the broken line 53 to illustrate their placement. The right end of the bar 50, as viewed in FIG. 12, is mounted in a structural member 54 which may be part of the chassis of an automobile or the like. This structural member 54 corresponds to the structural member 26 of FIGS. 1–3.

It is advisable, during the normal running of the motor vehicle when no braking action takes place, to lift the sensing pins completely off the brake disc 11 or 32, by means not shown and, only when the brake is actuated, to bring them close to the respective discs far enough that, in case of a heavier braking than the continuous braking discussed in the beginning, the desired automatic, intermittently acting braking can take place.

It is to be appreciated that although resistors are illustrated as the variable elements or elements of the strain gauges, other circuit components could be used as well, such as piezoelectric or magnetostrictive members, for example.

It is to be appreciated that the foregoing description of the illustrative embodiments has been given by way of example, not of limitation. Numerous various and other embodiments are possible without departing from the spirit and scope of the invention, the scope being defined in the appended claims.

That which is claimed is:

1. An apparatus for measuring the rpm of a rotating shaft comprising, in combination: a transmission gear train, driven by said shaft; a circular disc, disposed to be driven in rotation by said transmission gear, a surface of said disc having at least a given degree of roughness; at least one resiliently mounted sensing pin having a face of at least of a predetermined area, said face having at least a predetermined degree of roughness and being positioned opposite said surface of said disc in close proximity thereto; and a strain gauge, associated with said sensing pin; whereby the circular disc when rotated by the rotatable shaft transports an air stream past the face of the sensing pin so as to displace the sensing pin, said strain gauge delivering electrical signals related to the displacement.

2. An apparatus according to claim 1, wherein said sensing pin is resiliently mounted for displacement in a direction which is substantially tangential to the direction of rotation of said circular disc.

3. An apparatus according to claim 1, wherein said sensing pin is resiliently mounted for displacement in a direction which is substantially perpendicular to a direction which is tangential to the direction of rotation of said circular disc.

4. An apparatus according to claim 1, wherein said disc is a brake disc of a motor vehicle.

5. An apparatus according to claim 1, wherein said at least one sensing pin and said disc are provided with a protective enclosure means.

6. An apparatus according to claim 5, wherein said disc is a brake disc of a motor vehicle.

7. An apparatus according to claim 1, wherein a space traversed by said disc, and said at least one sensing pin are provided with a protective enclosure means.

8. An apparatus according to claim 7, wherein said disc is a brake disc of a motor vehicle.

9. An apparatus according to claim 1, wherein said at least one pin is movable with respect to said disc; whereby it can be brought out of operative position and held at a considerable distance therefrom.

10. An apparatus according to claim 1, including two sensing pins having the constructional features of the at least one sensing pin, these two sensing pins being disposed respectively in the vicinity of opposite side surfaces of said disc and being resiliently mounted for displacement in a direction substantially tangential to the direction of rotation of said disc.

11. An apparatus according to claim 1, wherein said sensing pin is mounted opposite the circumferential surface of said disc and is resiliently mounted for displacement in a direction substantially tangential to the direction of rotation of said disc.

12. An apparatus according to claim 1, including two sensing pins having the constructional features of the at least one sensing pin, these two sensing pins being disposed respectively to the vicinity of opposite side surfaces of said disc and being resiliently mounted on respective springs for displacement in a direction substantially perpendicular to a direction which is tangential to the direction of rotation of said circular disc.

13. An apparatus according to claim 1, wherein said sensing pin is mounted opposite to the circumferential surface of said disc and is resiliently mounted for displacement in a direction substantially perpendicular to a direction which is tangential to the direction of rotation of said circular disc.

* * * * *